(12) United States Patent
Duan et al.

(10) Patent No.: US 10,886,656 B2
(45) Date of Patent: Jan. 5, 2021

(54) AUTOMOTIVE ELECTRICAL PLUG CONNECTOR AND AUTOMOTIVE ELECTRICAL RECEPTACLE CONNECTOR

(71) Applicant: ADVANCED-CONNECTEK INC., New Taipei (TW)

(72) Inventors: Shu-Lin Duan, New Taipei (TW); Wei Wan, New Taipei (TW); Hua-Yan Wu, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 12 days.

(21) Appl. No.: 16/543,017

(22) Filed: Aug. 16, 2019

(65) Prior Publication Data
US 2020/0059030 A1    Feb. 20, 2020

(30) Foreign Application Priority Data
Aug. 17, 2018  (CN) ..................... 2018 2 1330489 U

(51) Int. Cl.
*H01R 13/436* (2006.01)
*H01R 13/428* (2006.01)
(Continued)

(52) U.S. Cl.
CPC ......... *H01R 13/4361* (2013.01); *B60R 16/03* (2013.01); *H01R 13/428* (2013.01);
(Continued)

(58) Field of Classification Search
CPC ............ H01R 13/4362; H01R 13/6272; H01R 13/639; H01R 13/4361; H01R 13/6273;
(Continued)

(56) References Cited

U.S. PATENT DOCUMENTS

| 5,653,613 | A | * | 8/1997 | Shimoda | ............ | H01R 13/4361 439/752 |
| 5,830,013 | A | * | 11/1998 | Saito | ................... | H01R 13/4362 439/595 |

(Continued)

*Primary Examiner* — Edwin A. Leon
*Assistant Examiner* — Matthew T Dzierzynski
(74) *Attorney, Agent, or Firm* — Muncy, Geissler, Olds & Lowe, P.C.

(57) ABSTRACT

An automotive electrical plug connector and an automotive electrical receptacle connector mating with the automotive electrical plug connector are provided. The automotive electrical plug connector includes an insulated housing, plug terminals, terminal fixing plates, and a positioning member. Upper and lower surfaces of the insulated housing has buckling grooves for positioning the terminal fixing plates, so that the front ends of the terminal fixing plates are abutted against the plug terminals, and the plug terminals can be prevented from detaching off terminal grooves of the insulated housing. Moreover, when the positioning member is assembled in an engaging groove at the side surface of the insulated housing, the positioning member is moved from a movable position to a locked position, and the automotive electrical plug connector and the automotive electrical receptacle connector can be locked with each other.

14 Claims, 19 Drawing Sheets

(51) Int. Cl.
*B60R 16/03* (2006.01)
*H01R 13/502* (2006.01)
*H01R 13/627* (2006.01)

(52) U.S. Cl.
CPC ....... *H01R 13/4362* (2013.01); *H01R 13/502* (2013.01); *H01R 13/6272* (2013.01)

(58) Field of Classification Search
CPC .............. H01R 13/641; H01R 2201/26; H01R 13/506; H01R 13/4223; H01R 13/502; H01R 13/6271; H01R 13/6397; H01R 13/7032; H01R 2107/00; B60R 16/03
See application file for complete search history.

(56) References Cited

U.S. PATENT DOCUMENTS

| | | | | |
|---|---|---|---|---|
| 5,839,923 A * | 11/1998 | Yoshida | .............. | H01R 13/4362 439/752 |
| 6,010,374 A * | 1/2000 | Miwa | ................ | H01R 13/4362 439/752 |
| 6,066,008 A * | 5/2000 | Brantingham | ..... | H01R 13/4362 439/595 |
| 6,648,699 B1 * | 11/2003 | Makino | .............. | H01R 13/4362 439/595 |
| 6,893,277 B2 * | 5/2005 | Parrish | ................ | H01R 13/506 439/188 |
| 7,104,829 B2 * | 9/2006 | Volpone | ............. | H01R 13/6272 439/358 |
| 7,534,139 B2 * | 5/2009 | Andre | .................... | H01R 12/69 439/587 |
| 7,556,539 B2 * | 7/2009 | Takahashi | .......... | H01R 13/4362 439/752 |
| 8,628,344 B2 * | 1/2014 | Cole | ................. | H01R 13/6272 439/352 |
| 9,407,026 B2 * | 8/2016 | Campbell | .......... | H01R 13/4362 |
| 9,705,228 B2 * | 7/2017 | Caldwell | ............ | H01R 13/4365 |
| 9,742,116 B1 * | 8/2017 | Nishiyama | ......... | H01R 13/6272 |
| 9,917,381 B1 * | 3/2018 | Campbell | ................ | H01R 9/16 |
| 9,929,508 B2 * | 3/2018 | Puhl | ..................... | H01R 13/639 |
| 9,941,636 B2 * | 4/2018 | Jodon De Villeroche | | .................. H01R 13/641 |
| 10,109,953 B2 * | 10/2018 | Schmidt | ............. | H01R 13/639 |
| 10,148,034 B2 * | 12/2018 | Lyon | ................. | H01R 13/4361 |
| 10,673,166 B2 * | 6/2020 | Hung | ................ | H01R 13/4361 |
| 2017/0207590 A1 * | 7/2017 | Dombrowski | ..... | H01R 13/6273 |
| 2019/0140386 A1 * | 5/2019 | Dillon | ................ | H01R 13/4361 |

\* cited by examiner

AUTOMOTIVE ELECTRICAL PLUG CONNECTOR AND AUTOMOTIVE ELECTRICAL RECEPTACLE CONNECTOR

CROSS-REFERENCE TO RELATED APPLICATION

This non-provisional application claims priority under 35 U.S.C. § 119(a) to Patent Application No. 201821330489.9 filed in China, P.R.C. on Aug. 17, 2018, the entire contents of which are hereby incorporated by reference.

FIELD OF THE INVENTION

The instant disclosure relates to an electrical connector, and more particular to an automotive electrical plug connector and an automotive electrical receptacle connector.

BACKGROUND

Mobiles with smart and new generation energy sources become the trends in the developments of automotive industries. Specifically, to the electrical components of automotives, the connection between the plug and socket (receptacle) is to be adapted.

The plug connector and the receptacle connector known to the inventor(s) are positioned with each other by connector position assurance (CPA) devices. The connector assembly with the connector position assurance device prevents the plug and receptacle from being detached unintentionally. Therefore, the user can assemble the plug with the receptacle quickly and the user can confirm whether the connector assembly is properly assembled by checking the CPA, thereby achieving the connection reliability for the electrical system.

SUMMARY OF THE INVENTION

In view of this, an embodiment of the instant disclosure provides an automotive electrical plug connector. The automotive electrical plug connector comprises an insulated housing, a plurality of plug terminals, a plurality of terminal fixing plates, and a positioning member. One of two ends of the insulated housing has an insertion end, and the other end of the insulated housing has a connection end. The insulated housing comprises a plurality of terminal grooves, a plurality of buckling grooves, an engaging groove, an elastic arm, and a latch. The terminal grooves are defined through the insertion end and the connection end. The buckling grooves are on an upper surface of the insulated housing, on a lower surface of the insulated housing, and at the insertion end. The engaging groove is at a connection surface between the insertion end and the connection end. The elastic arm is at a side surface of the connection end and outside the engaging groove. The latch is at a side surface of the insertion end and outside the engaging groove. A protruding block is protruding from an inner portion of the elastic arm. The plug terminals are respectively inserted into the terminal grooves. Each of the plug terminals comprises a cover at the insertion end, and an end portion of each of the covers is at the corresponding buckling groove. The terminal fixing plates are at the buckling grooves. Each of the terminal fixing plates is abutted against the end portion of the corresponding cover. The positioning member is inserted into the engaging groove. A recessed groove is on a side surface of the positioning member. A tongue portion is extending from one end of the positioning member, and the tongue portion is at an inner lateral surface of the latch. When the positioning member is at a locked position, the protruding block of the elastic arm is buckled with the recessed groove of the positioning member, and the tongue portion of the positioning member is abutted against the inner lateral surface of the latch, so that the latch is positioned.

In one or some embodiments, when the positioning member is at a movable position, the protruding block of the elastic arm detaches from the recessed groove of the positioning member and the tongue portion of the positioning member detaches from the inner lateral surface of the latch.

In one or some embodiments, a limiting groove is recessed from one side of each of the terminal grooves, and each of the plug terminals comprises a sidearm at the corresponding limiting groove.

In one or some embodiments, one of two ends of each of the terminal fixing plates is bent to form a sliding block, a recessed portion is recessed from one of two ends of each of the buckling grooves, and the recessed portions are provided for limiting the sliding blocks.

In one or some embodiments, the other end of each of the terminal fixing plates comprises a flexible arm, an inner portion of the other end of each of the buckling grooves is recessed to form a mating groove, the mating grooves are provided for limiting the flexible arms.

In one or some embodiments, a tap block is protruding from the side surface of the positioning member, the insulated housing comprises a sliding groove recessed from the elastic arm, and the tap block is in the sliding groove.

In one or some embodiments, the insulated housing comprises a plurality of blocking portions at two sides of an opening of the sliding groove.

In one or some embodiments, each of the plug terminals comprises a positioning sheet combined with the corresponding cover, and each of the positioning sheets is at the corresponding terminal groove and is at the connection end.

In one or some embodiments, the insulated housing comprises a plurality of stopping blocks, and each of the stopping blocks is at an inner portion of the corresponding buckling groove.

In one or some embodiments, two sidewalls are bilaterally protruding from the positioning member. When the positioning member is at the locked position, the sidewalls are abutted against an outer wall of the engaging groove and at the insertion end.

In one or some embodiments, an extension block is outwardly extending from an end portion of the elastic arm.

An automotive electrical receptacle connector for mating with the automotive electrical plug connector is also provided. The automotive electrical receptacle connector comprises a receptacle shell and a plurality of receptacle terminals. The receptacle shell comprises a receptacle cavity and an insertion opening. The receptacle cavity is mated with the insertion end, and the insertion opening is in communication with the receptacle cavity. A outer wall of the receptacle shell comprises a buckling hole defined through the receptacle cavity. The receptacle terminals are received in the receptacle shell.

In one or some embodiments, the receptacle shell comprises a push block outwardly protruding from an edge portion of the insertion opening.

In one or some embodiments, when the insertion end is inserted into the receptacle cavity, a distance between a front lateral surface of the insertion end and an inner lateral surface of the receptacle cavity is 0.6 mm.

As above, according to one or some embodiments of the instant disclosure, the terminal fixing plates are positioned in the buckling grooves to abut against the end portions of the covers of the plug terminals, so that the front ends of the terminal fixing plates is abutted against the plug terminals to prevent the plug terminals from detaching off the terminal grooves. Therefore, the plug terminals can be positioned properly. Furthermore, when the positioning member is at the locked position, the protruding block of the elastic arm is buckled with the recessed groove of the positioning member, and the tongue portion of the positioning member is abutted against the inner portion of the latch to ensure that the latch is positioned properly. When the automotive electrical plug connector is locked with the automotive electrical receptacle connector, the latch of the insulated housing is provided for locking the automotive electrical receptacle connector, and the tongue portion is abutted against the rear surface of the tongue portion. Therefore, the latch can be prevented from detaching off the buckling hole at the receptacle shell of the automotive electrical receptacle connector. conversely, when the positioning member is at the movable position, the protruding block of the elastic arm detaches from the buckling hole at the receptacle shell of the automotive electrical receptacle connector, and the tongue portion of the positioning member detaches from the inner portion of the latch, so that the latch detaches from the buckling hole at the receptacle shell of the automotive electrical receptacle connector. Hence, the automotive electrical plug connector and the automotive electrical receptacle connector are not locked with each other, and the automotive electrical plug connector can then detach from the automotive electrical receptacle connector.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
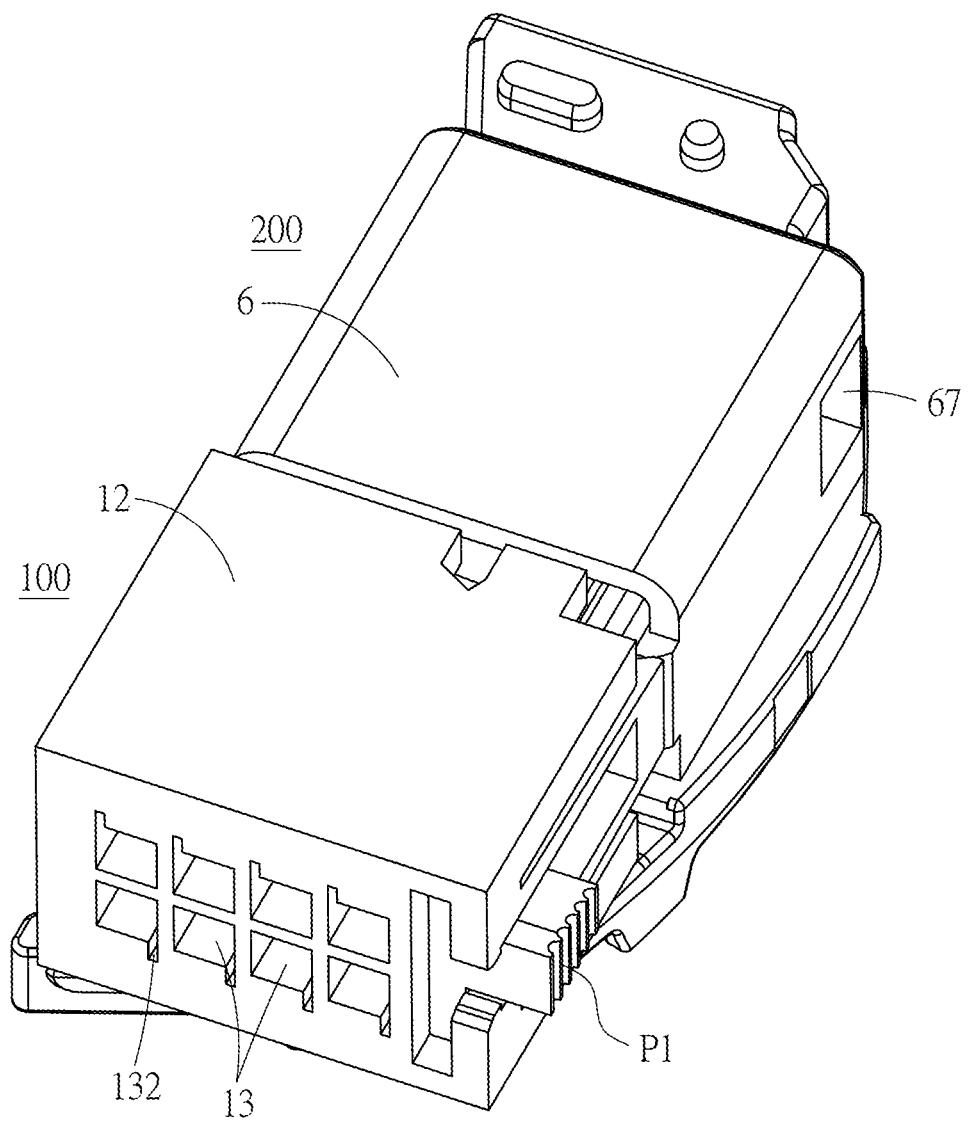
FIG. 1 illustrates a perspective view of a connector assembly having an automotive electrical plug connector and an automotive electrical receptacle connector according to a first embodiment of the instant disclosure.
Figure 2:
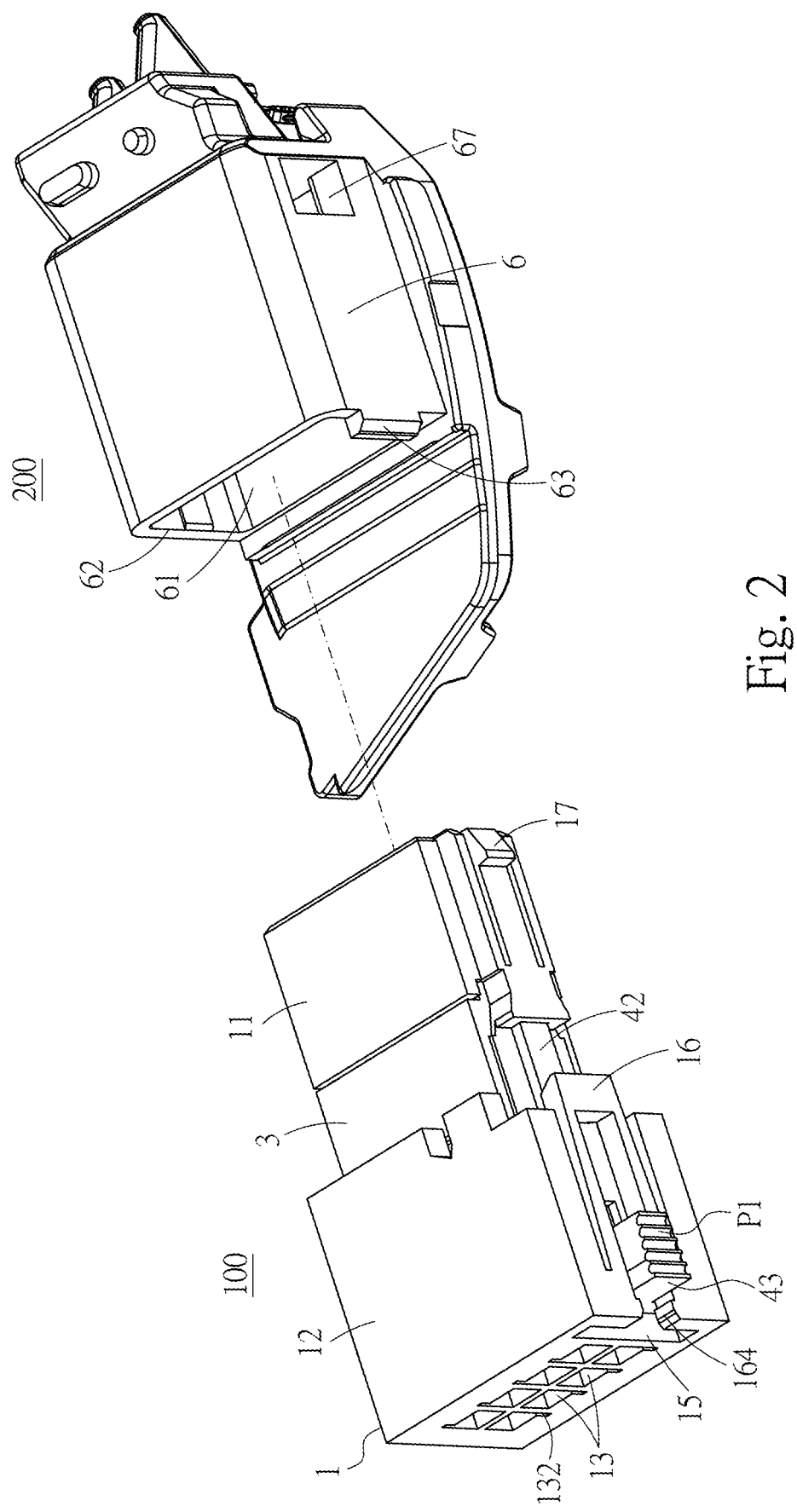
FIG. 2 illustrates an exploded view of the connector assembly of the first embodiment.
Figure 3:
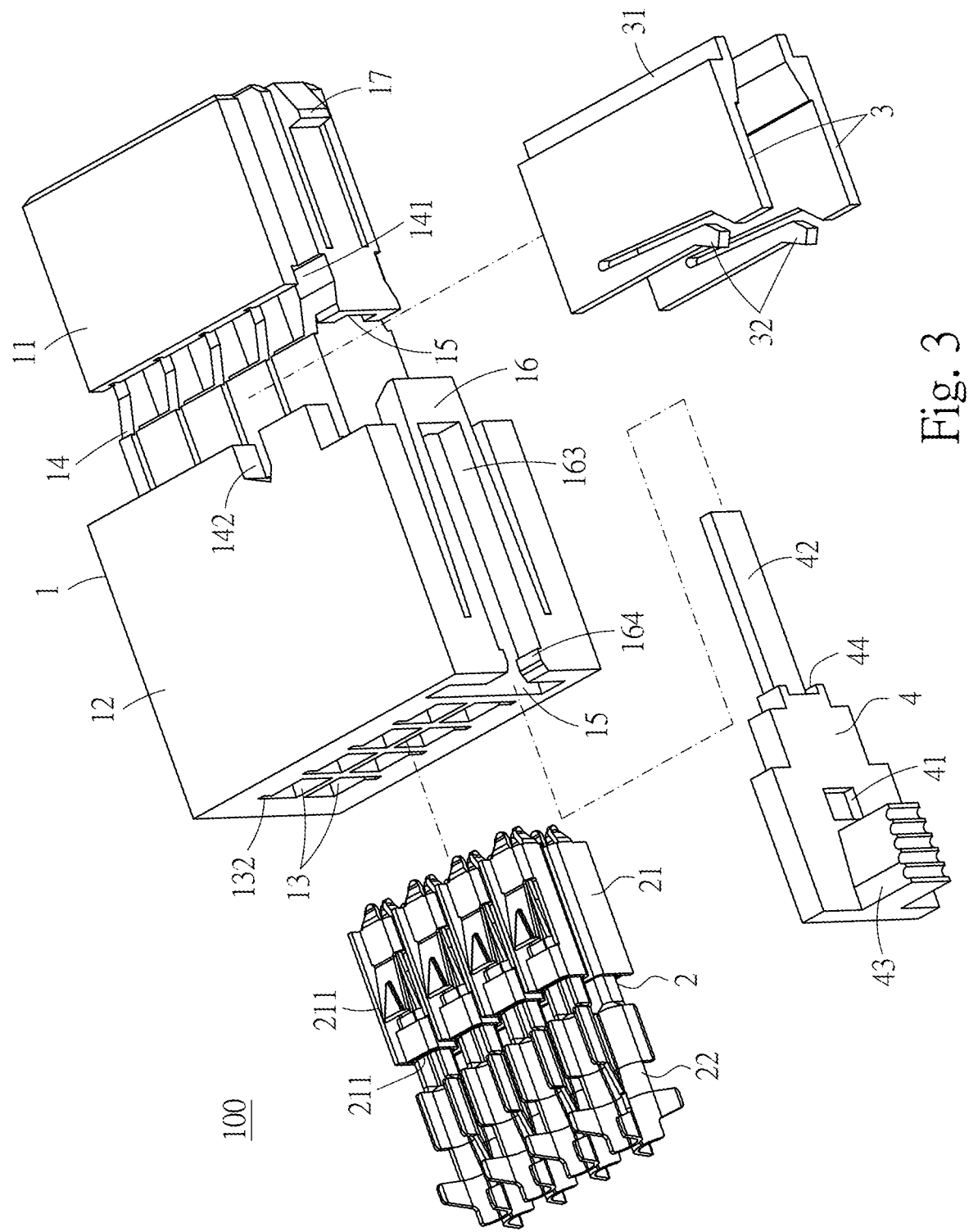
FIG. 3 illustrates an exploded view of the automotive electrical plug connector, according to the first embodiment.

Please refer to FIGS. 1 to 3, illustrating a connector assembly having an automotive electrical plug connector 100 and an automotive electrical receptacle connector 200 according to a first embodiment of the instant disclosure. FIG. 1 illustrates a perspective view of the connector assembly of the first embodiment. FIG. 2 illustrates an exploded view of the connector assembly of the first embodiment. FIG. 3 illustrates an exploded view of the automotive electrical plug connector of the first embodiment. In this embodiment, the automotive electrical plug connector 100 comprises an insulated housing 1, a plurality of plug terminals 2, a plurality of terminal fixing plates 3, and a positioning member 4.

Figure 4:
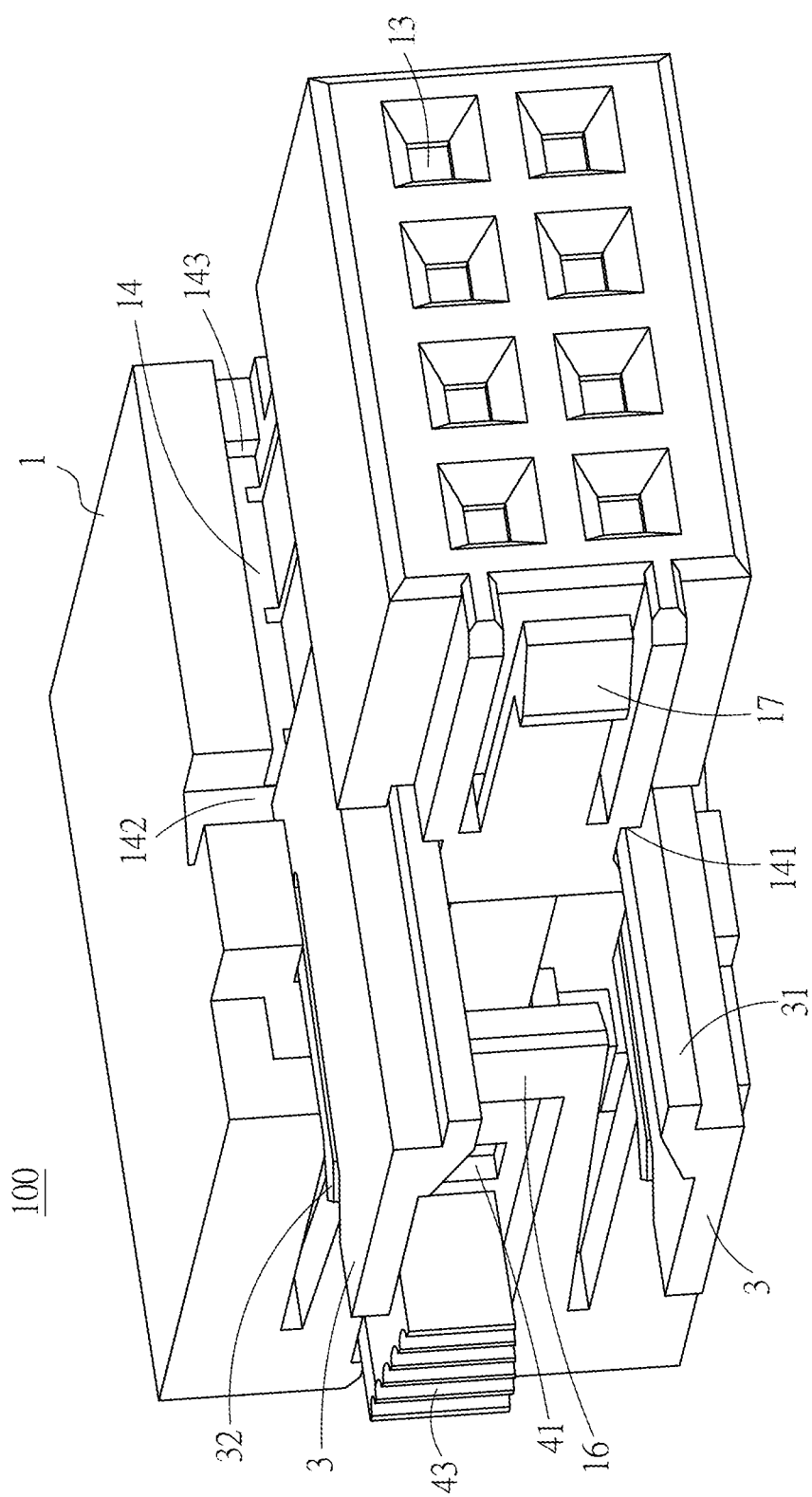
FIG. 4 illustrates an assembled view of the automotive electrical plug connector, according to the first embodiment.
Figure 5:
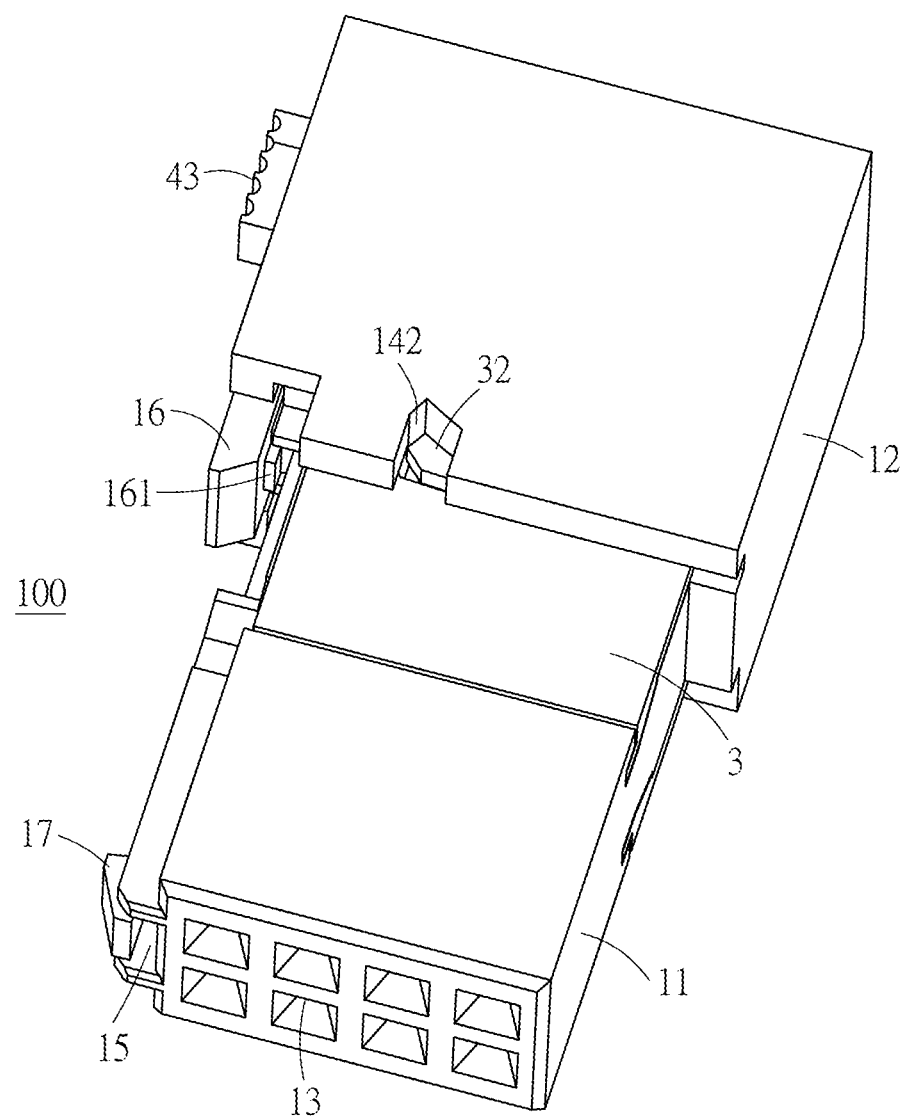
FIG. 5 illustrates a perspective view of the automotive electrical plug connector, according to the first embodiment.
Figure 6:
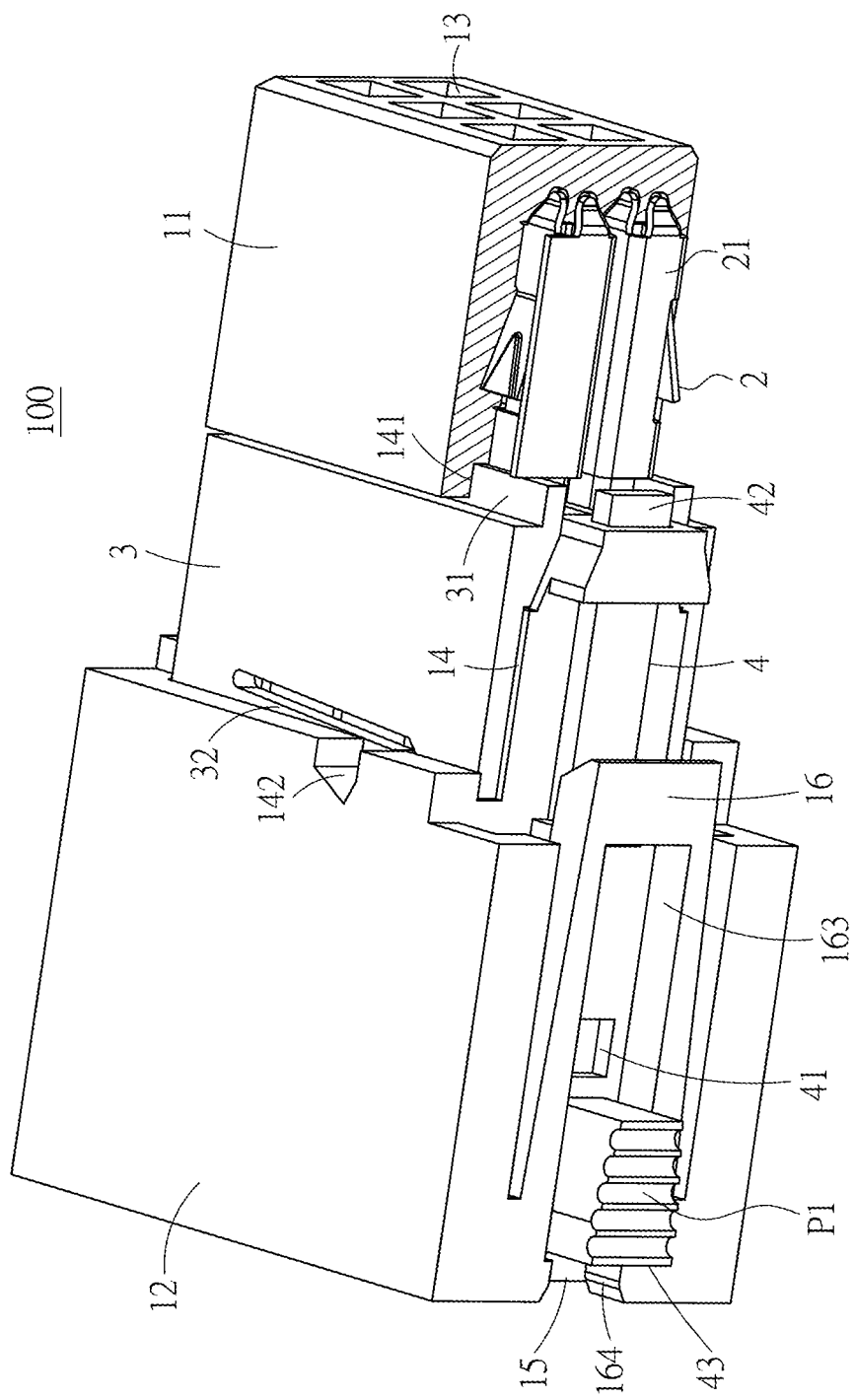
FIG. 6 illustrates a partial sectional view of the automotive electrical plug connector, according to the first embodiment.
Figure 7:
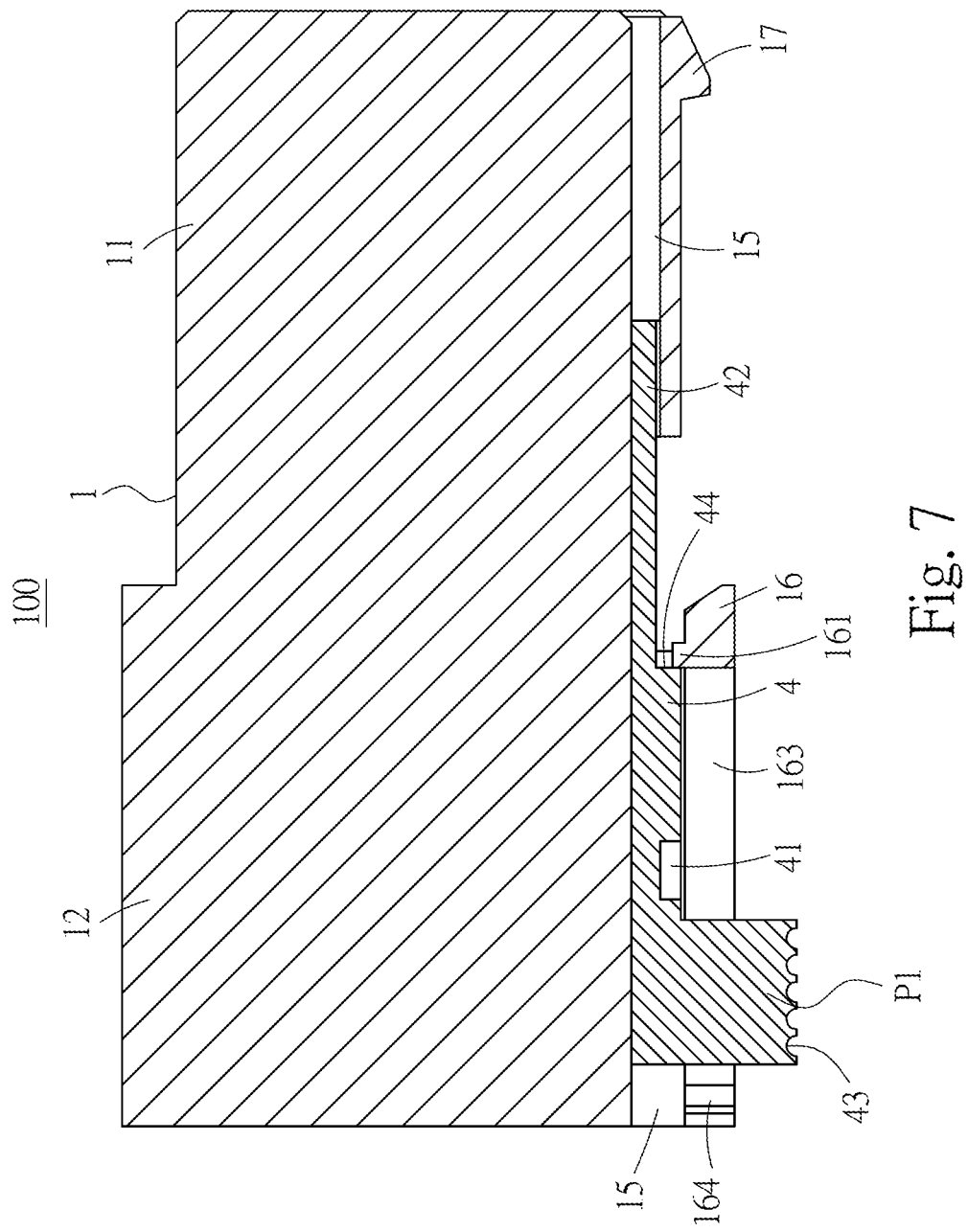
FIG. 7 illustrates a top sectional view of the automotive electrical plug connector, according to the first embodiment.
Figure 8:
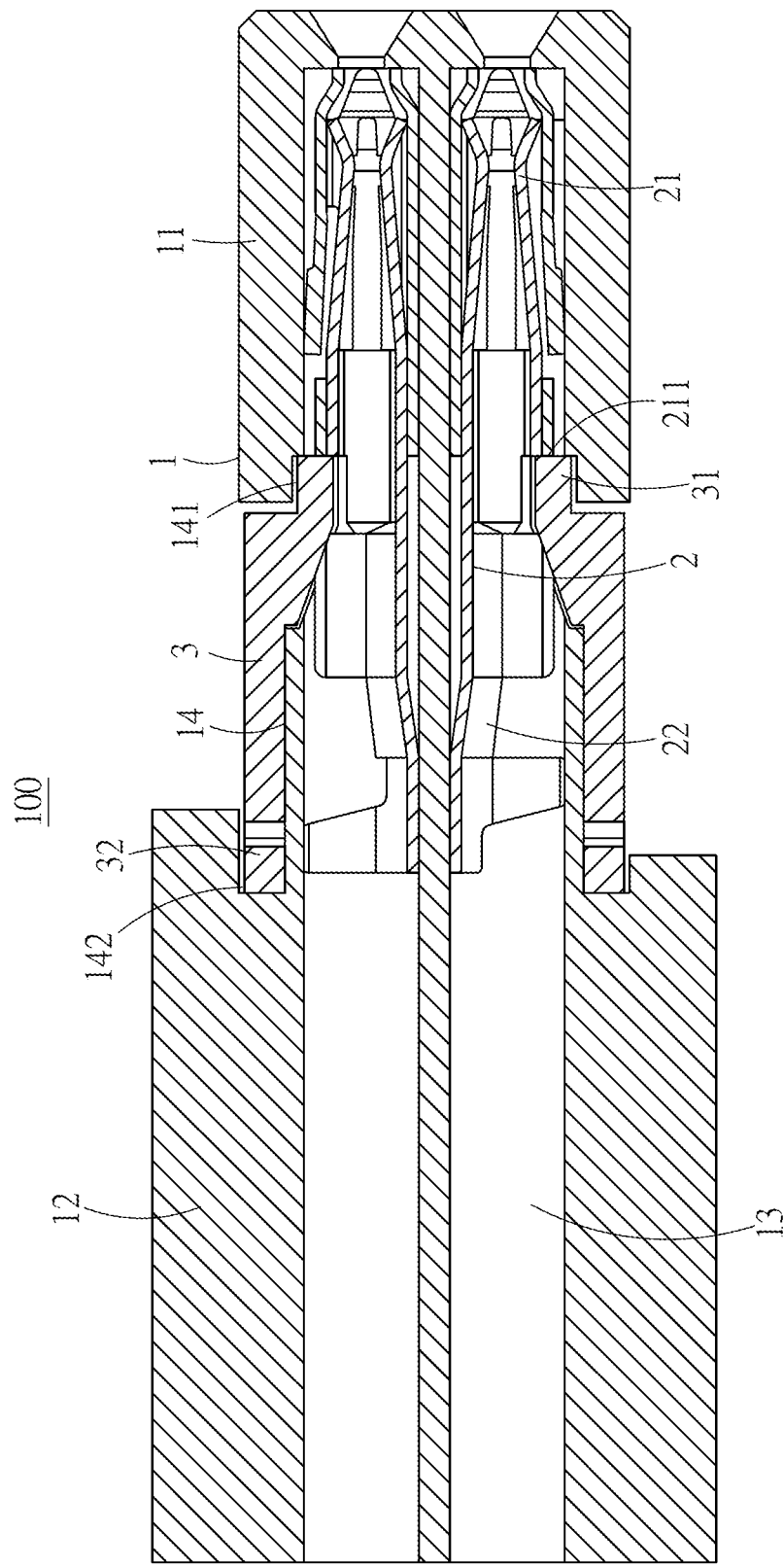
FIG. 8 illustrates a lateral sectional view of the automotive electrical plug connector, according to the first embodiment.

Please refer to FIGS. 3 to 8. FIG. 4 illustrates an assembled view of the automotive electrical plug connector of the first embodiment. FIG. 5 illustrates a perspective view of the automotive electrical plug connector of the first embodiment. FIG. 6 illustrates a partial sectional view of the automotive electrical plug connector of the first embodiment. FIG. 7 illustrates a top sectional view of the automotive electrical plug connector of the first embodiment. FIG. 8 illustrates a lateral sectional view of the automotive electrical plug connector of the first embodiment. In this embodiment, along a front-to-back direction the insulated housing 1 has an insertion end 11 at a front end, and a connection end 12 at a rear end. The size of the insertion end 11 is less than the size of the connection end 12. In other words, the cross-sectional area of the insertion end 11 is less than the cross-sectional area of the connection end 12. The insulated housing 1 comprises a plurality of terminal grooves 13. The terminal grooves 13 are defined through the insertion end 11 and the connection end 12 along the front-to-back direction. The insulated housing 1 comprises a plurality of buckling grooves 14 on the upper surface of the insulated housing 1 and the lower surface of the insulated housing 1. The buckling grooves 14 are near the insertion end 11. The insulated housing 1 comprises an engaging groove 15 which is formed at a connection surface and along the front-to-back direction. The connection surface is connected between the upper surface of the insulated housing 1 and the lower surface of the insulated housing 1 and between the insertion end 11 and the connection end 12. The insulated housing 1 further comprises an elastic arm 16 formed at a side surface of the connection end 12 and formed outside the engaging groove 15. The insulated housing 1 further comprises a latch 17 formed at a side surface of the insertion end 11 along the front-to-back direction and formed outside the engaging groove 15. The latch 17 has a hook structure protruded out along a transverse direction perpendicular to the front-to-back direction. A protruding block 161 is protruding from an inner portion of the elastic arm 16 along the transverse direction toward the side surface of the connection end 12.

Specifically, in this embodiment, the insulated housing 1 of the automotive electrical plug connector 100 has eight terminal grooves 13. The positioning member 4 is assembled into the engaging groove 15. The insulated housing 1 comprises the elastic arm 16 and the latch 17 for mating with the automotive electrical receptacle connector 200. The buckling grooves 14 are formed at the middle region of the insulated housing 1 for assembling with the terminal fixing plates 3 from an upper portion of the insulated housing 1 and from a lower portion of the insulated housing 1. In this embodiment, each of the terminal grooves 13 of the insulated housing 1 comprises a limiting groove 132 in rectangular shaped. The limiting grooves 132 provide a foolproof function and prevent the plug terminals 2 from being inserted into the terminal grooves 13 incorrectly.

Please refer to FIGS. 3 to 6. In this embodiment, the plug terminals 2 are inserted into the terminal grooves 13, respectively. Each of the plug terminals 2 comprises a cover 21 at the insertion end 11, and an end portion of each of the covers 21 is at the corresponding buckling groove 14.

Please refer to FIGS. 3 to 6. In this embodiment, the terminal fixing plates 3 are at the buckling grooves 14, and each of the terminal fixing plates 3 is abutted against the end portion of the corresponding cover 21. Furthermore, a front end of each of the terminal fixing plates 3 is bent to form a step-shaped sliding block 31, and a recessed portion 141 is recessed from one of two ends of each of the buckling grooves 14. The recessed portions 141 are provided for limiting the sliding blocks 31. Moreover, the other end of each of the terminal fixing plates 3 comprises a flexible arm 32, and an inner portion of the other end of each of the buckling grooves 14 is recessed to form a mating groove 142. The mating grooves 142 are provided for limiting the flexible arms 32.

Specifically, in this embodiment, each of front portions of the terminal fixing plates 3 at the upper portion and the lower portion of the insulated housing 1 of the automotive electrical plug connector 100 has a sliding block 31. The sliding block 31 is step shaped. The sliding blocks 31 are adapted to be mated with the buckling grooves 14. When the sliding blocks 31 are assembled in the buckling grooves 14, the sliding blocks 31 limit movements of the plug terminals 2 assembled with the insulated housing 1 so as to prevent the plug terminals 2 from being detached from the insulated housing 1. Furthermore, the flexible arm 32 at the rear portion of each of the terminal fixing plates 3 is adapted to limit the movement of the insulated housing 1 after the terminal fixing plates 3 are assembled with the insulated housing 1.

Figure 9:
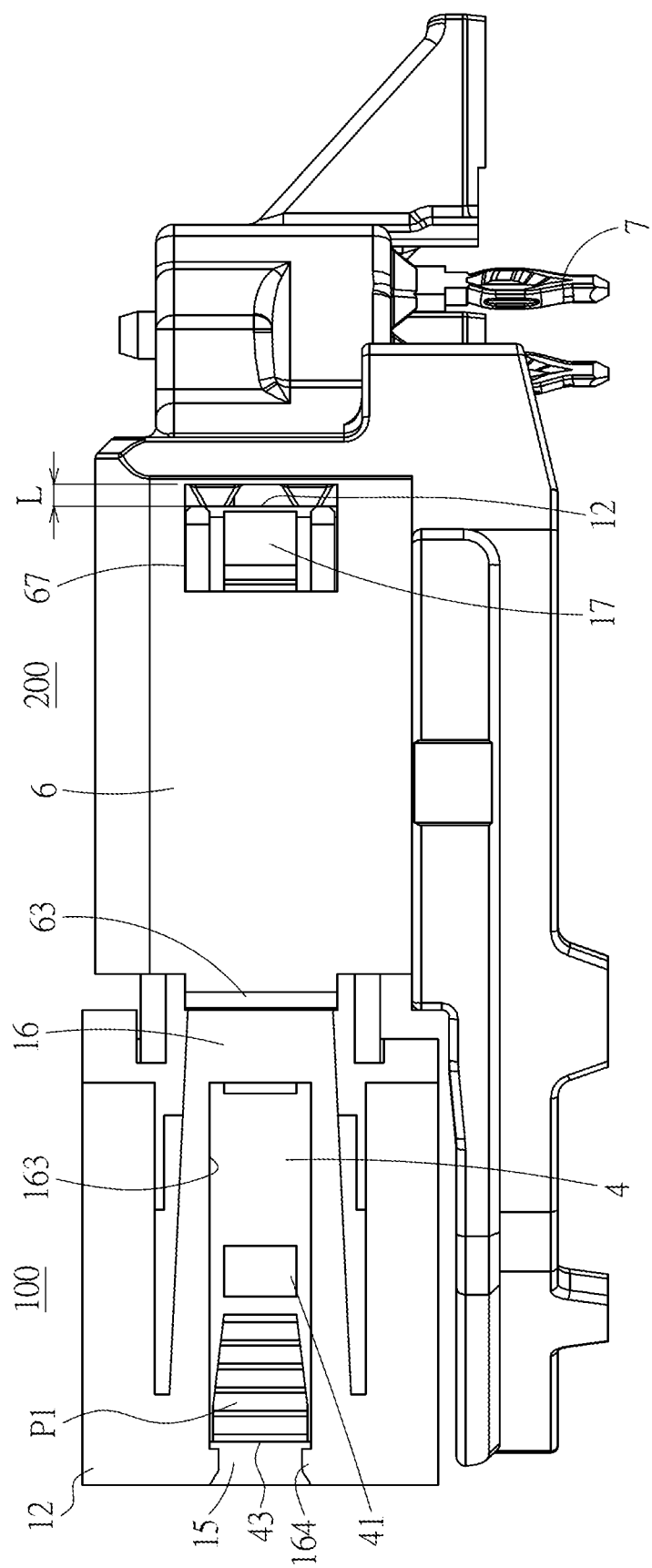
FIG. 9 illustrates a lateral assembled view of the connector assembly having the automotive electrical plug connector and the automotive electrical receptacle connector of the first embodiment.
Figure 10:
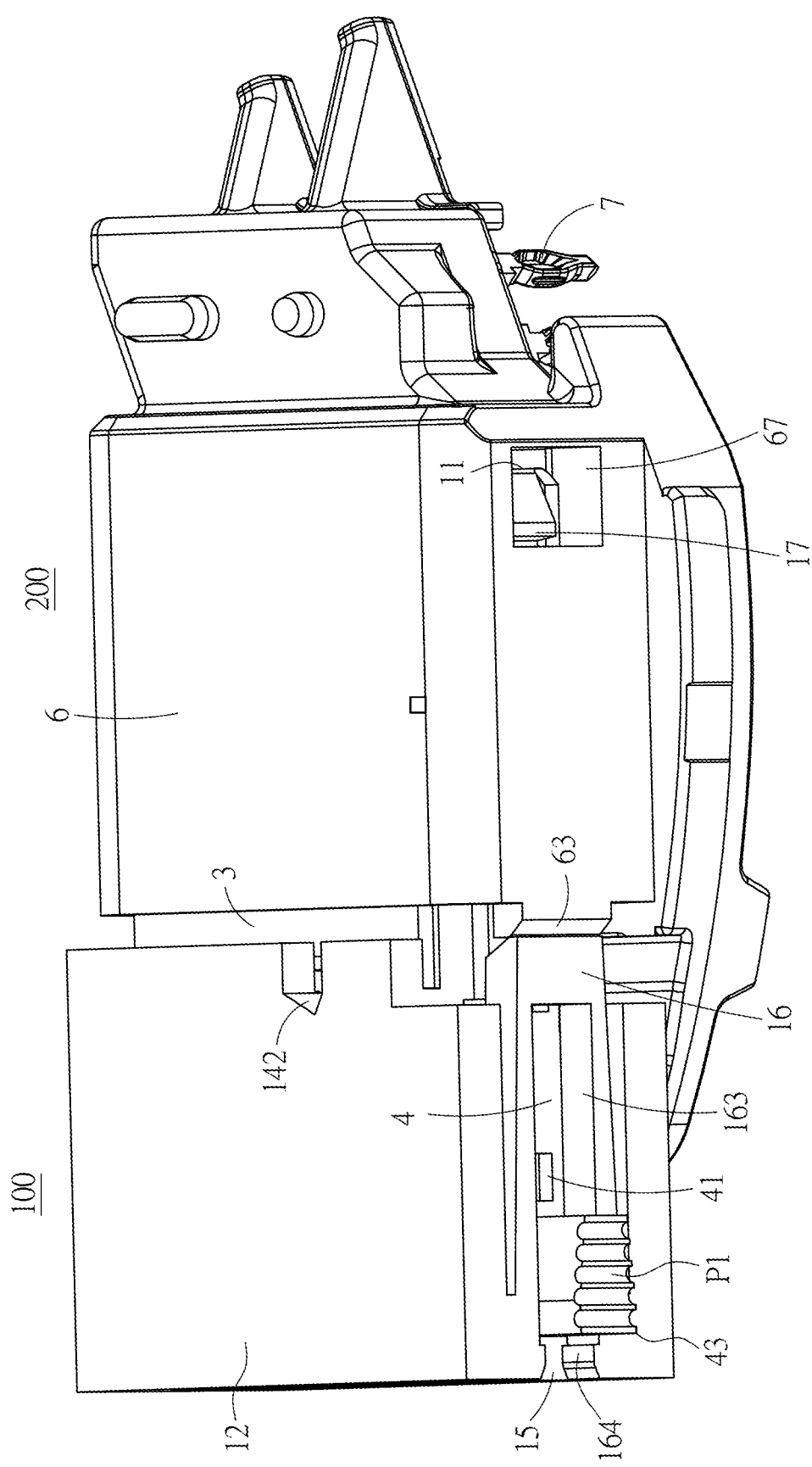
FIG. 10 illustrates an axonometric perspective view (1) of the connector assembly having the automotive electrical plug connector and the automotive electrical receptacle connector of the first embodiment.
Figure 11:
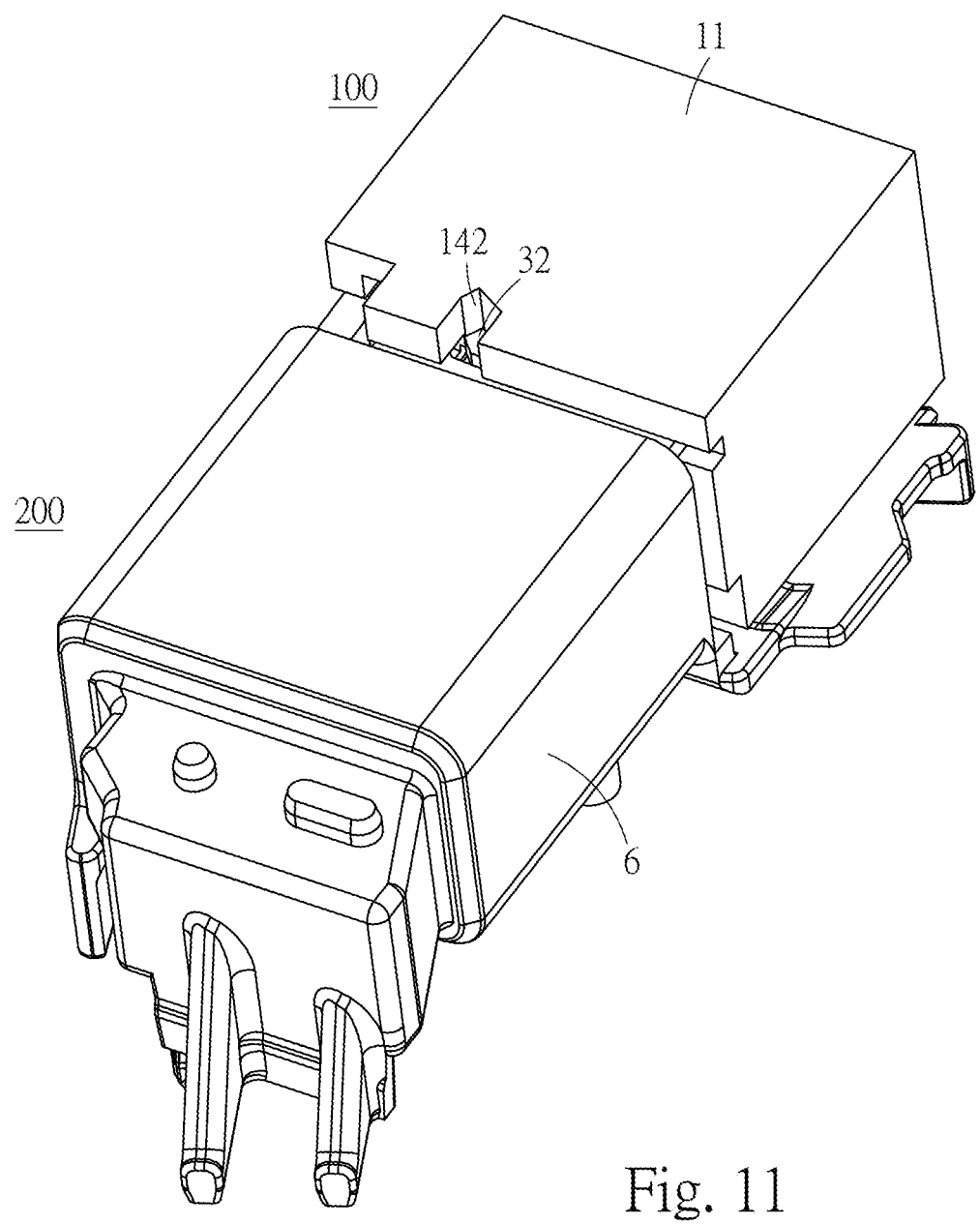
FIG. 11 illustrates an axonometric perspective view (2) of the connector assembly having the automotive electrical plug connector and the automotive electrical receptacle connector of the first embodiment.
Figure 12:
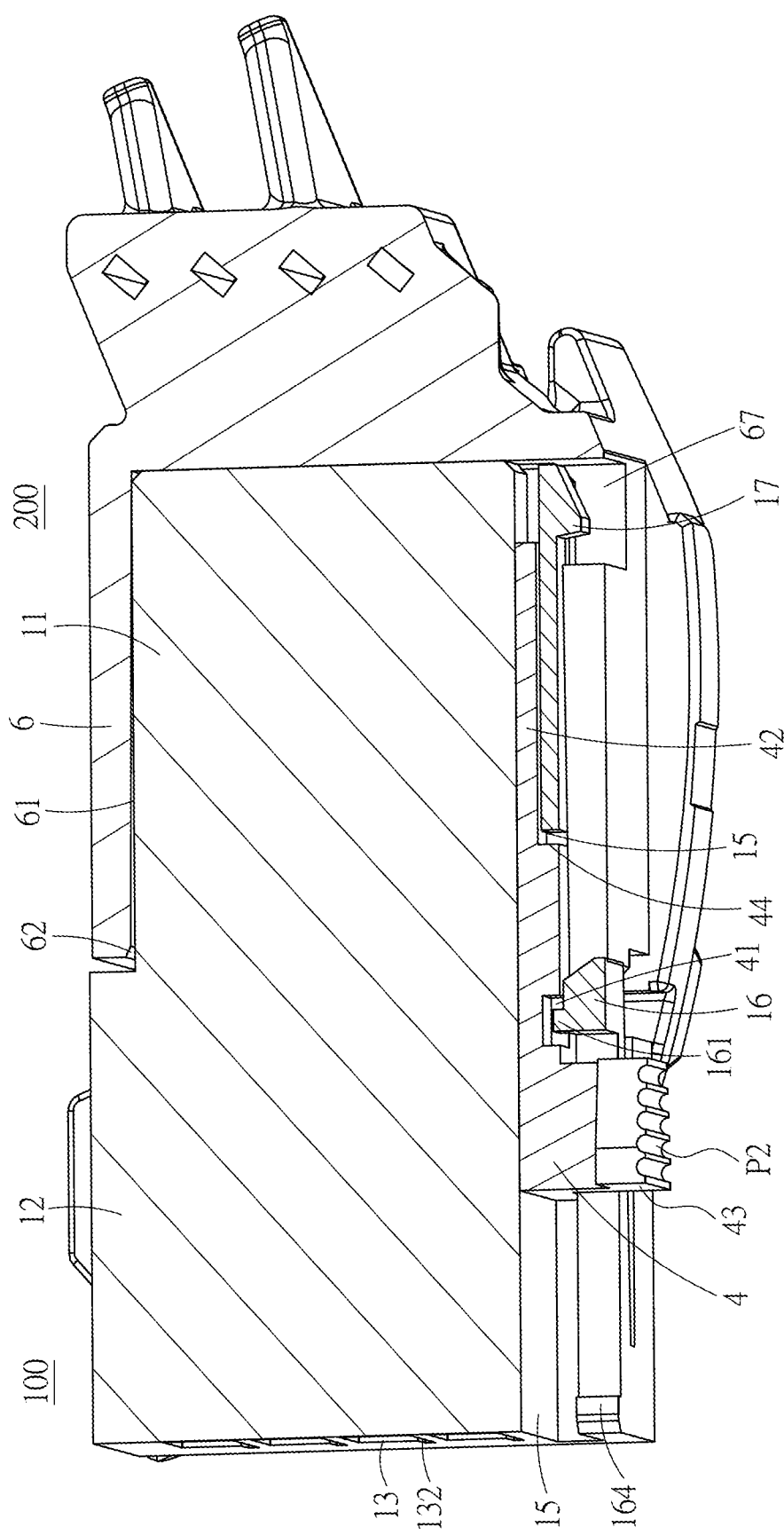
FIG. 12 illustrates a sectional view showing that a positioning member of the automotive electrical plug connector is in an inserted condition, according to the first embodiment.
Figure 13:
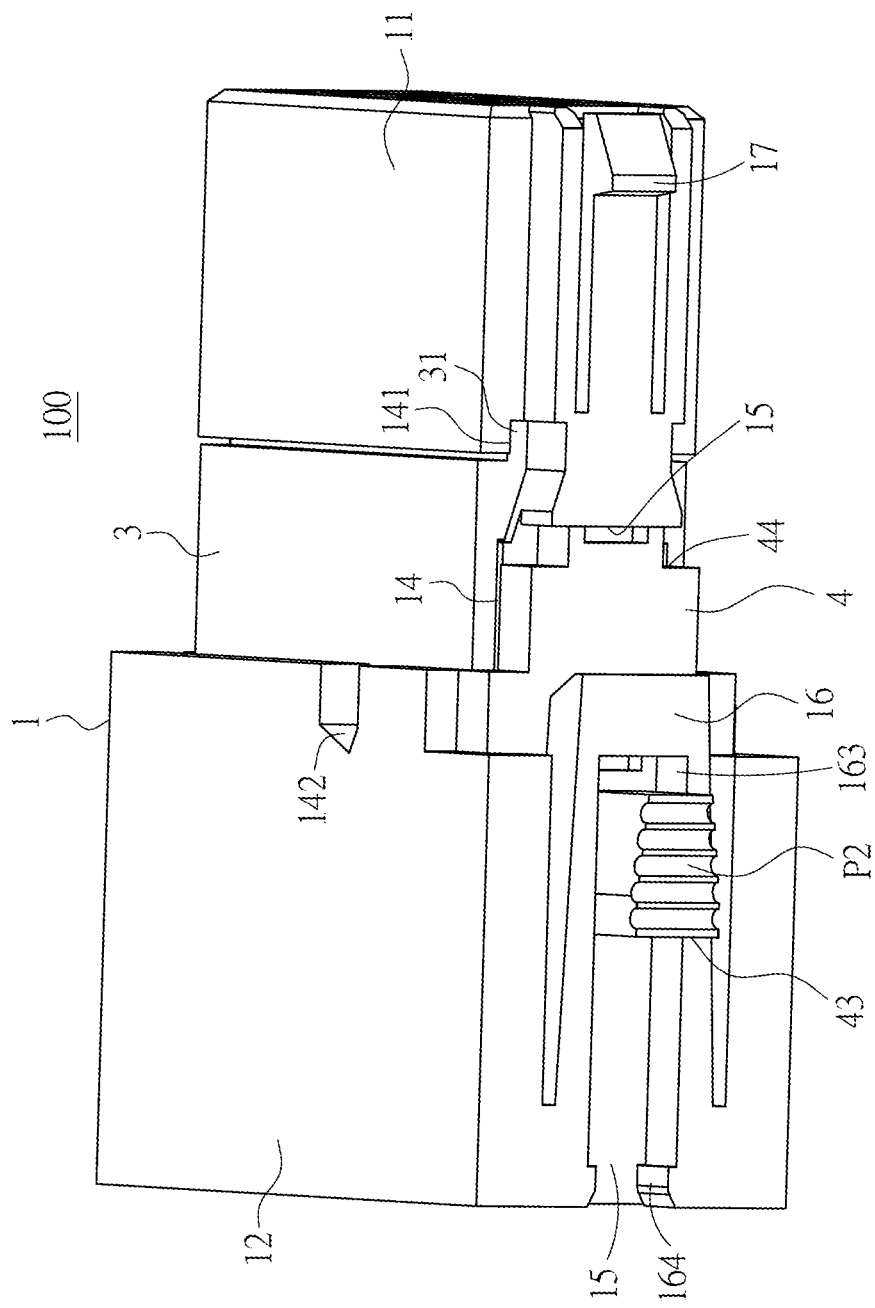
FIG. 13 illustrates a perspective view showing that the positioning member of the automotive electrical plug connector is in the inserted condition, according to the first embodiment.

Please refer to FIG. 3 and FIGS. 9 to 13. FIG. 9 illustrates a lateral assembled view of the connector assembly of the first embodiment. FIG. 10 illustrates an axonometric perspective view (1) of the connector assembly of the first embodiment. FIG. 11 illustrates an axonometric perspective view (2) of the connector assembly of the first embodiment. FIG. 12 illustrates a sectional view showing that the positioning member of the automotive electrical plug connector is in an inserted condition, according to the first embodiment. FIG. 13 illustrates a perspective view showing that the positioning member of the automotive electrical plug connector is in the inserted condition, according to the first embodiment. In this embodiment, the positioning member 4 is inserted into the engaging groove 15. A recessed groove 41 is on a side surface of the positioning member 4. A tongue portion 42 is extending from one end of the positioning member 4 along the front-to-back direction, and the tongue portion 42 is at an inner lateral surface of the latch 17. Moreover, in this embodiment, a tap block 43 is protruding from the side surface of the positioning member 4 along the transverse direction, the insulated housing 1 comprises a sliding groove 163 recessed from the elastic arm 16, and the tap block 43 is in the sliding groove 163. Furthermore, the insulated housing 1 comprises a plurality of blocking portions 164 at two sides of an opening of the sliding groove 163.

When the positioning member 4 is at a locked position P2, the protruding block 161 of the elastic arm 16 is buckled with the recessed groove 41 of the positioning member 4, and the tongue portion 42 of the positioning member 4 is abutted against the inner lateral surface of the latch 17, so that the latch 17 is positioned. Conversely, when the positioning member 4 is at a movable position P1, the protruding block 161 of the elastic arm 16 detaches from the recessed groove 41 of the positioning member 4, and the tongue portion 42 of the positioning member 4 detaches from the inner lateral surface of the latch 17.

Specifically, in this embodiment, one tap block 43 is protruding from the positioning member 4 of the automotive electrical plug connector 100, and the tap block 43 has several slots for increasing the friction between the user's hand and the positioning member 4. Furthermore, the positioning member 4 has one recessed groove 41. When the automotive electrical plug connector 100 is mated with and locked with the automotive electrical receptacle connector 200, the protruding block 161 of the elastic arm 16 is mated with the recessed groove 41 of the positioning member 4. The tongue portion 42 is extending from a front end of the positioning member 4. Hence, when the automotive electrical plug connector 100 is mated with and locked with the automotive electrical receptacle connector 200, the tongue portion 42 is abutted against the latch 17 to reduce the swing space for the latch 17, so that the latch 17 can be prevented from detaching off a buckling hole 67 of the receptacle shell 6 of the automotive electrical receptacle connector 200.

Please refer to FIGS. 2, 4, 5, and FIGS. 9 to 13. Specifically, in this embodiment, the receptacle shell 6 of the automotive electrical receptacle connector 200 comprises a push block 63 outwardly protruding from an edge portion of an insertion opening 62 of the receptacle shell 6, and the push block 63 is adapted to be mated with the elastic arm 16 of the automotive electrical plug connector 100. When the insulted housing 1 is assembled with the plug terminals 2, the terminal fixing plates 3 are assembled in the buckling grooves 14 for limiting plug terminals 2 from the upper portion and the lower portion of the insulated housing 1. A stopping block 143 at an inner portion of the corresponding buckling groove 14 of the insulated housing 1 stops the plug terminals 2 moving forwardly. On the other hand, after the terminal fixing plates 3 are properly assembled with the insulated housing 1, the flexible arms 32 of the terminal fixing plates 3 are located in the mating grooves 142 of the insulated housing 1, so that the backward movements of the terminal fixing plates 3 are limited. Therefore, the bilateral movements of the terminal fixing plates 3 are limited. Such configuration reduces not only the cost for the molding but also the cost for the assembly. After the terminal fixing plates 3 are properly assembled with the insulated housing 1, the sliding blocks 31 limit the plug terminals 2 from being detached off the terminal grooves 13, so that the plug terminals 2 can function properly when the automotive electrical plug connector 100 is in use.

Please refer to FIGS. 3 to 8. In this embodiment, a limiting groove 132 is recessed from one side of each of the terminal grooves 13, and each of the plug terminals 2 comprises a sidearm 212 at the corresponding limiting groove 132. Moreover, each of the plug terminals 2 comprises a positioning sheet 22 combined with the corresponding cover 21, and each of the positioning sheets 22 is at the corresponding terminal groove 13 and is at the connection end 12.

Specifically, in this embodiment, each of the plug terminals 2 of the automotive electrical plug connector 100 comprises a cover 21 and a positioning sheet 22 combined with the cover 21. The connection portion between the cover 21 and the positioning sheet 22 is the end portion of the cover 21. The end portion of the cover 21 is at the corresponding buckling groove 14. After the plug terminals 2 are assembled in the terminal grooves 13, the terminal fixing plates 3 limit the plug terminals 2 by limiting the end portions of the covers 21 of the plug terminals 2.

Please refer to FIG. 4. In this embodiment, the insulated housing 1 comprises a plurality of stopping blocks 143, and each of the stopping blocks 143 is at an inner portion of the corresponding buckling groove 14.

Please refer to FIGS. 12 and 13. In this embodiment, two sidewalls 44 are bilaterally protruding from the positioning member 4. When the positioning member 4 is at the locked position P2, the sidewalls 44 are abutted against an outer wall of the engaging groove 15 and at the insertion end 11.

Specifically, in this embodiment, the positioning member 4 of the automotive electrical plug connector 100 is inserted into the engaging groove 15 of the insulated housing 1, so that the lateral movements of the positioning member 4 are limited. After the positioning member 4 is assembled with the insulated housing 1, the protruding block 161 of the elastic arm 16 limits the positioning member 4 from moving forwardly. Moreover, after the positioning member 4 is inserted into the insulated housing 1 by a proper depth, the two stopping portions 164 (in this embodiment, two reversed pins) of the insulated housing 1 limit the positioning member 4 from moving backwardly, so that the positioning member 4 is not detached from the insulated housing 1 unintentionally.

Please refer to FIG. 1 and FIGS. 9 to 12. In this embodiment, the automotive electrical receptacle connector 200 comprises a receptacle shell 6 and a plurality of receptacle terminals 7 received in the receptacle shell 6. The receptacle shell 6 comprises a receptacle cavity 61 corresponding to the insertion end 11. The receptacle shell 6 comprises an insertion opening 62 communicating with the receptacle cavity 61. An outer wall of the receptacle shell 6 comprises a buckling hole 67 defined through the receptacle cavity 61. Moreover, the receptacle shell 6 comprises a push block 63 outwardly protruding from an edge portion of the insertion opening 62. When the insertion end 11 is inserted into the receptacle cavity 61, a distance L between a front lateral surface of the insertion end 11 and an inner lateral surface of the receptacle cavity 61 is 0.6 mm.

Specifically, in this embodiment, when the automotive electrical plug connector 100 is mated with the automotive electrical receptacle connector 200, the push block 63 at the insertion opening 62 of the automotive electrical receptacle connector 200 is adapted to limit the automotive electrical plug connector 100, so that the distance L between the front lateral surface of the insertion end 11 (the head portion of the insertion end 11) and the inner lateral surface of the receptacle cavity 61 (the bottom portion of the receptacle cavity 61) is 0.6 mm. Hence, the latch 17 of the automotive electrical plug connector 100 is located in the buckling hole 67 of the automotive electrical receptacle connector 200, and the automotive electrical plug connector 100 can function normally.

When the automotive electrical plug connector 100 keeps moving forwardly, the push block 63 at the insertion opening 62 of the automotive electrical receptacle connector 200 pushes the elastic arm 16 of the automotive electrical plug connector 100 away. When the automotive electrical plug connector 100 is completely inserted into the automotive electrical receptacle connector 200, the distance L becomes zero (as shown in FIG. 12). In this configuration, the positioning member 4 is pushed forwardly, and the outer wall (the stepped portion) of the engaging groove 15 of the automotive electrical plug connector 100 limits the positioning member 4, so that the sidewalls 44 of the positioning member 4 are abutted against the outer wall of the engaging groove 15 (as shown in FIG. 12). In such condition, the protruding block 161 of the elastic arm 16 is just located in the recessed groove 41 of the positioning member 4. Hence, the tongue portion 42 at the front portion of the positioning member 4 is abutted against the latch 17 of the automotive electrical plug connector 100, and the automotive electrical plug connector 100 and the automotive electrical receptacle connector 200 are locked with each other.

Figure 14:
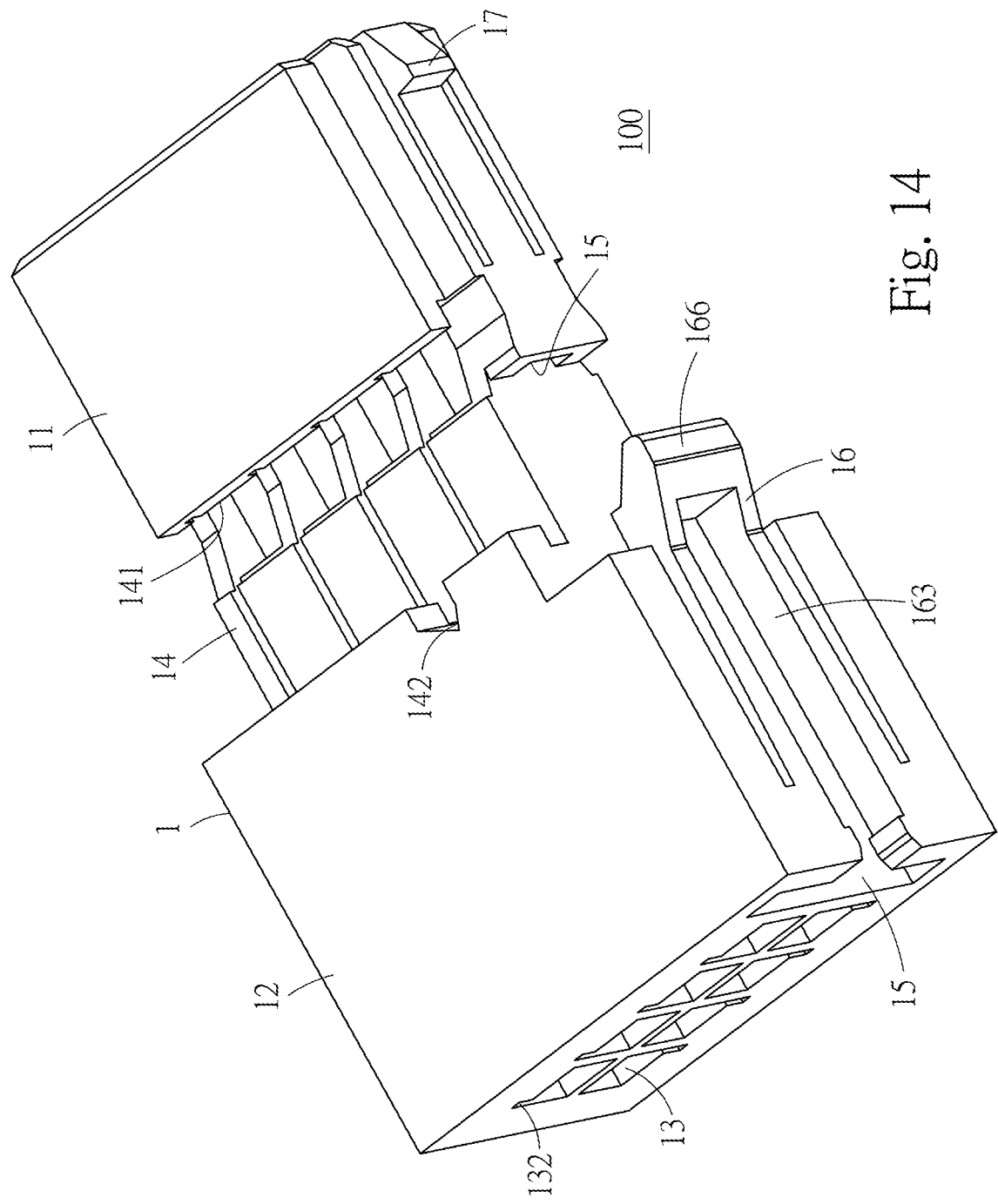
FIG. 14 illustrates a perspective view of an automotive electrical plug connector of a connector assembly according to a second embodiment of the instant disclosure.
Figure 15:
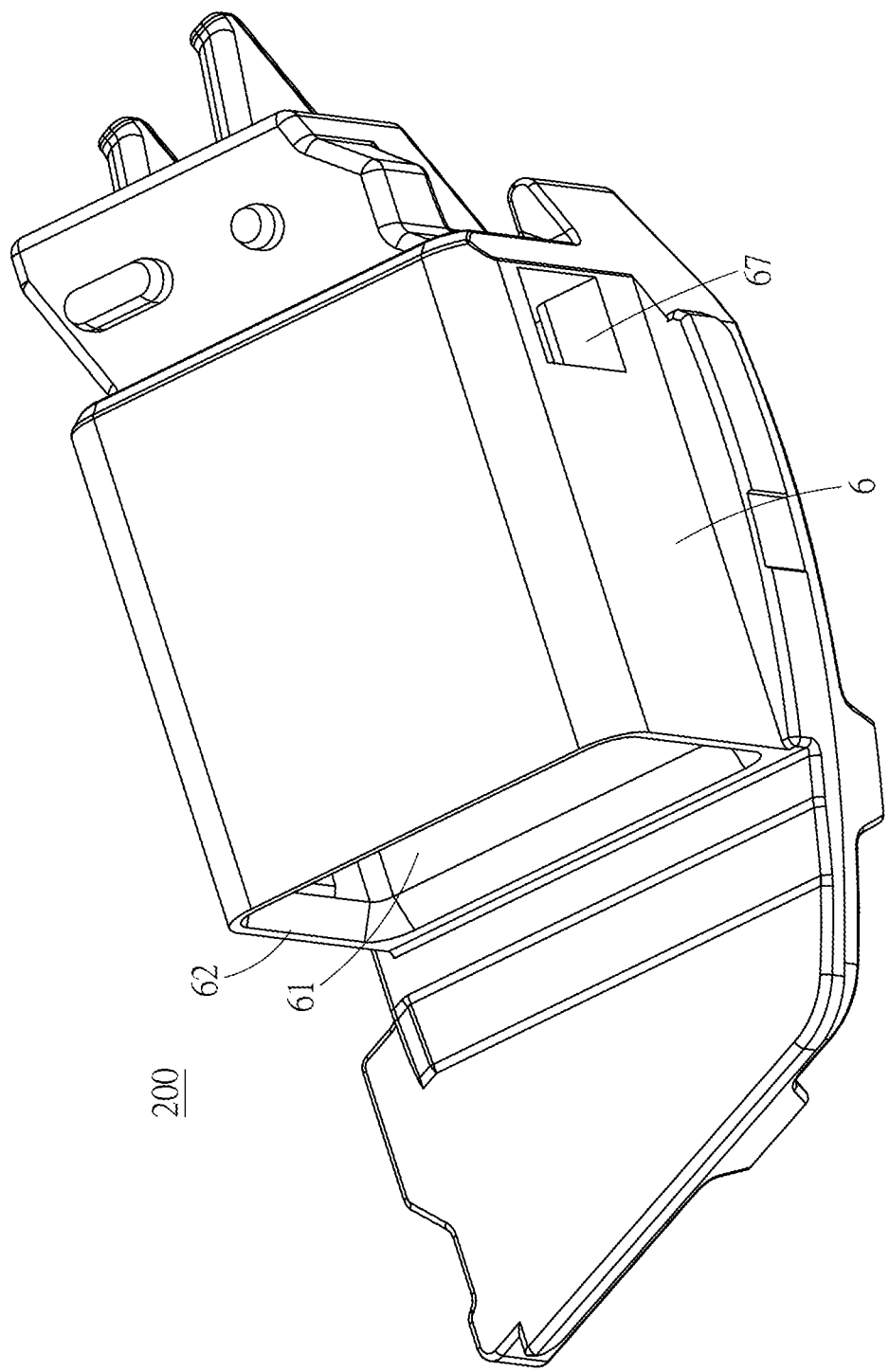
FIG. 15 illustrates a perspective view of an automotive electrical receptacle connector of the connector assembly of the second embodiment.
Figure 16:
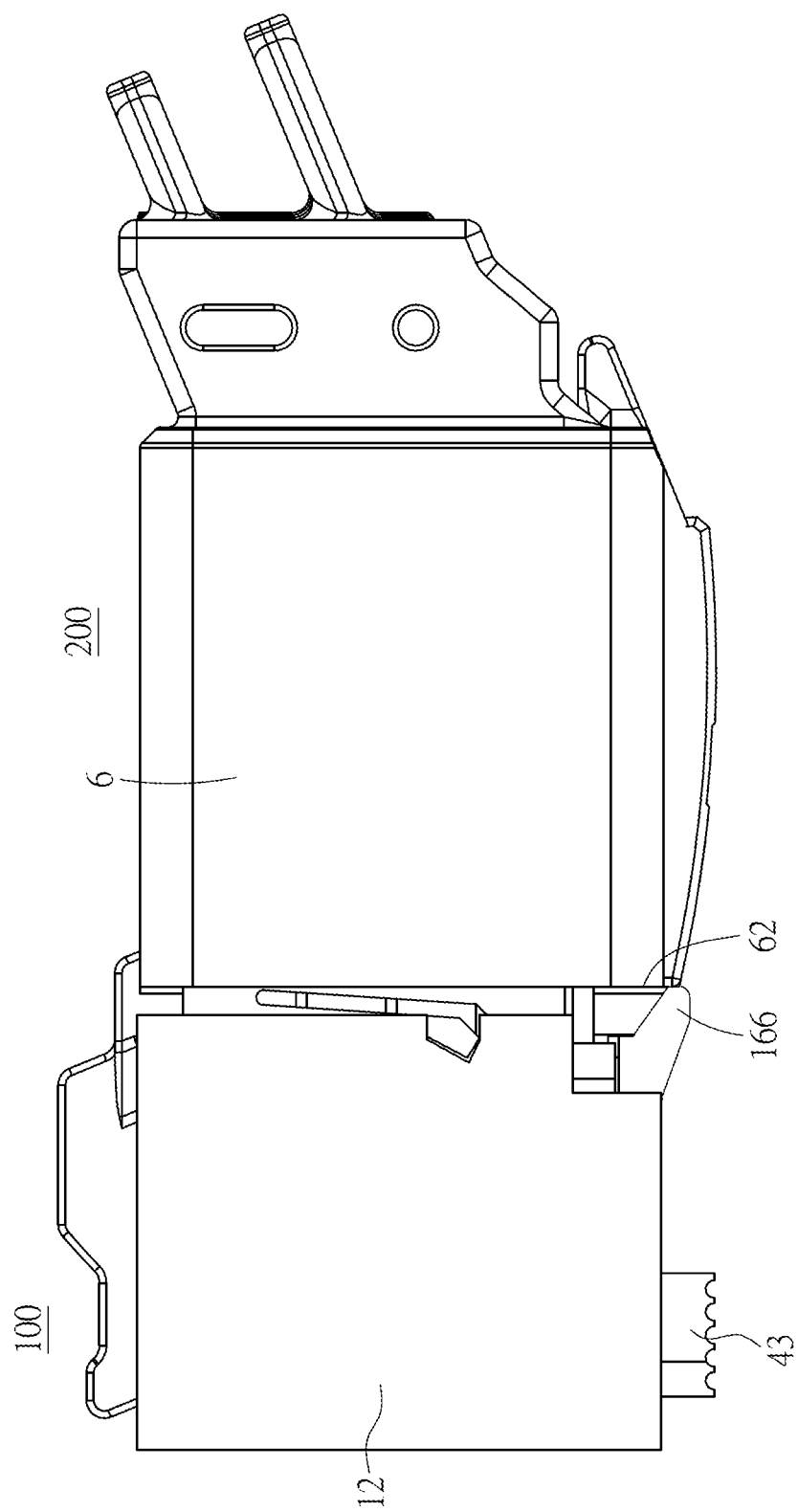
FIG. 16 illustrates a top view of the connector assembly having the automotive electrical plug connector and the automotive electrical receptacle connector of the second embodiment.
Figure 17:
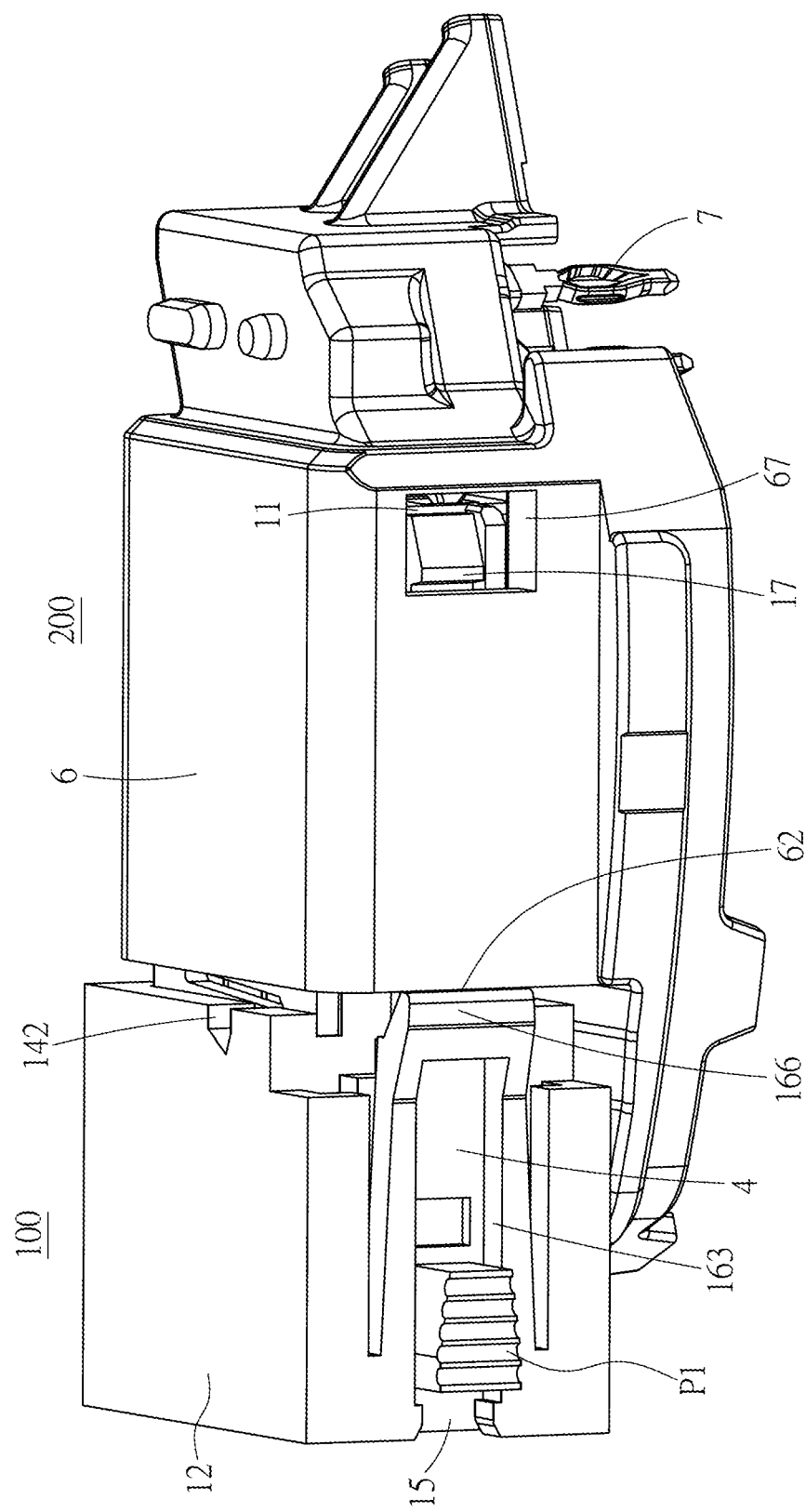
FIG. 17 illustrates an axonometric perspective view (1) of the connector assembly having the automotive electrical plug connector and the automotive electrical receptacle connector of the second embodiment.
Figure 18:
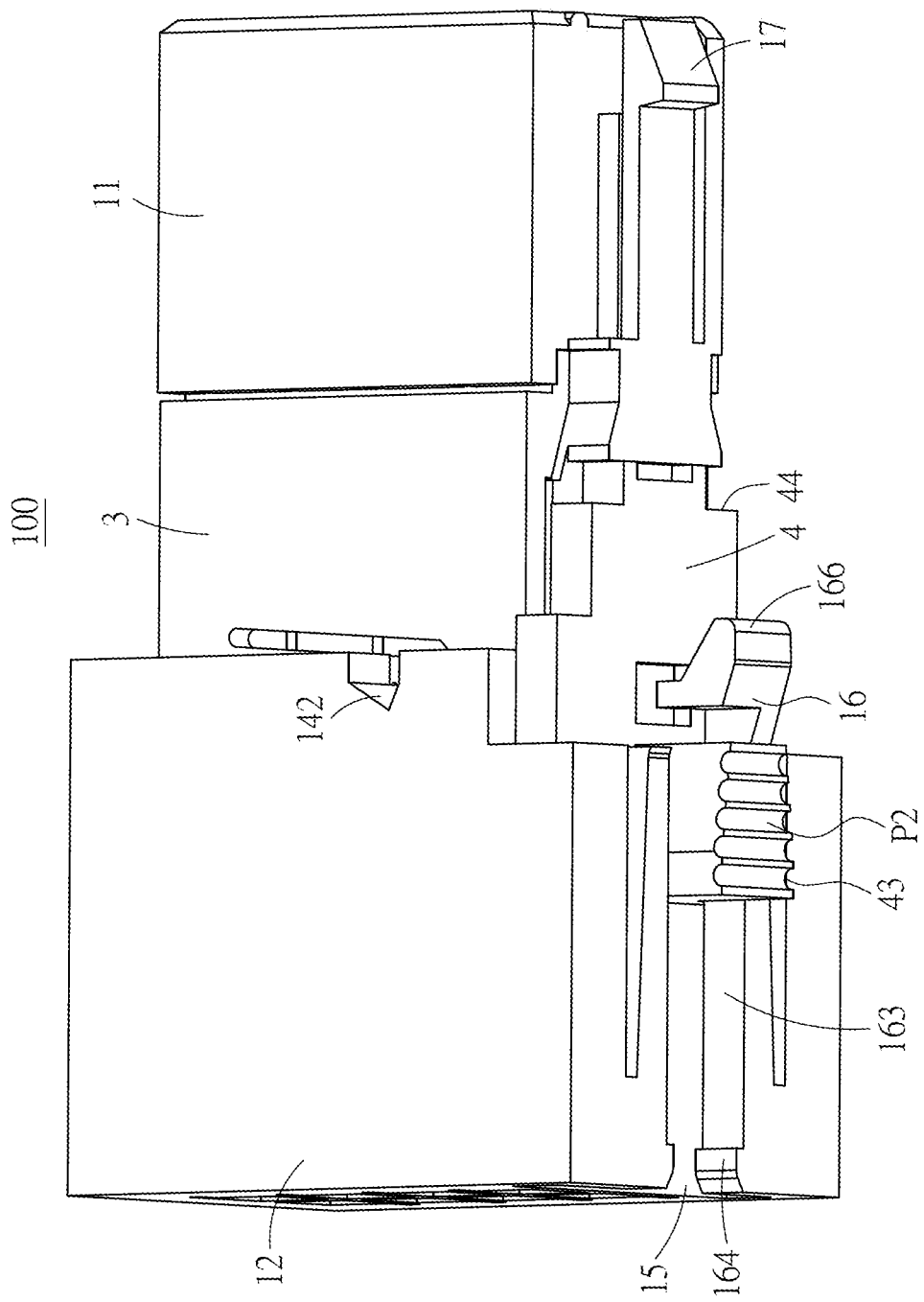
FIG. 18 illustrates a perspective view showing that a positioning member of the electrical plug connector is in the inserted condition, according to the second embodiment.
Figure 19:
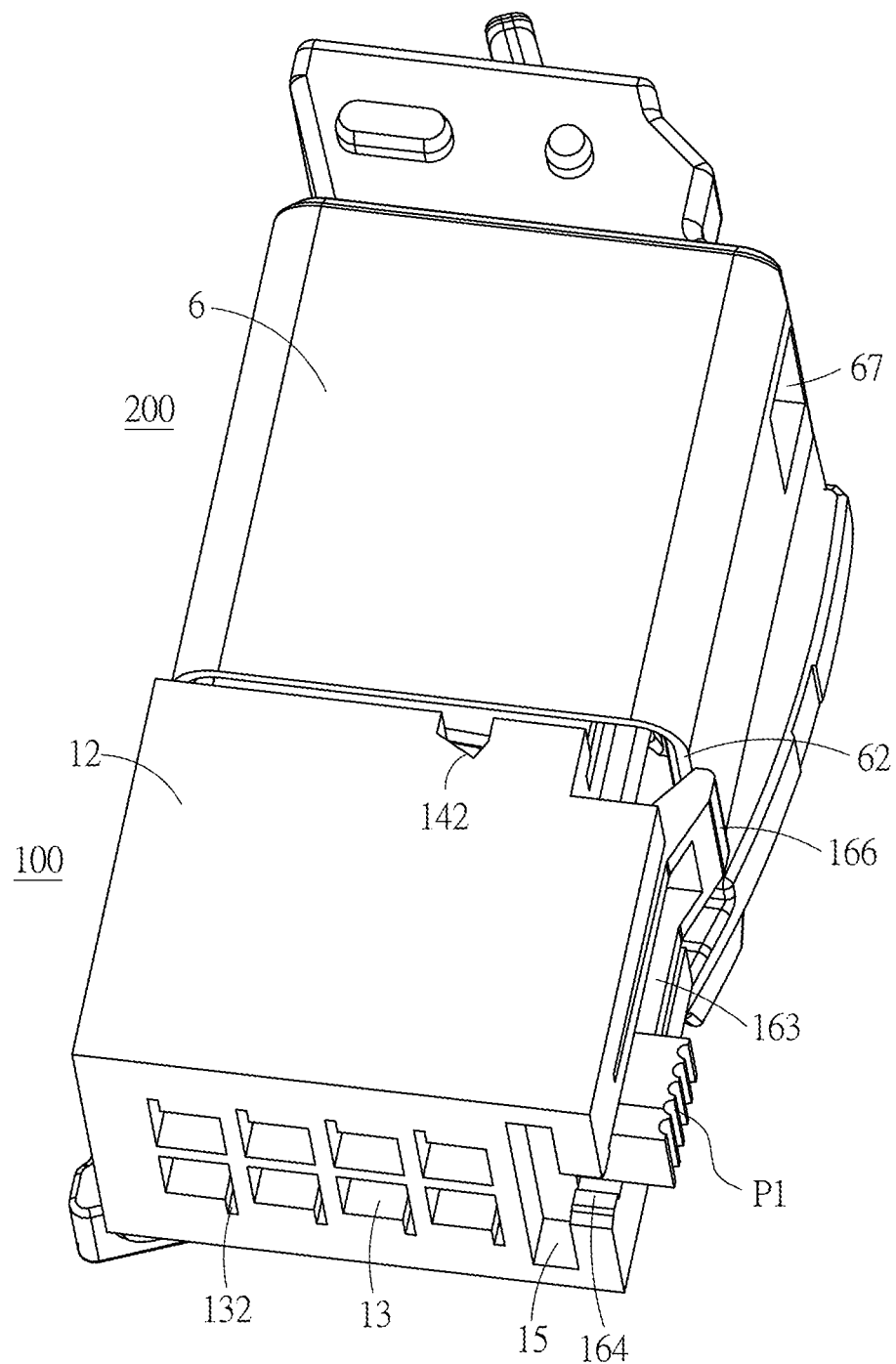
FIG. 19 illustrates an axonometric perspective view (2) of the connector assembly having the automotive electrical plug connector and the automotive electrical receptacle connector of the second embodiment.

Please refer to FIGS. 14 to 19, illustrating a connector assembly having an automotive electrical plug connector 100 and an automotive electrical receptacle connector 200 according to a second embodiment of the instant disclosure. FIG. 14 illustrates a perspective view of an automotive electrical plug connector of a connector assembly according to a second embodiment of the instant disclosure. FIG. 15 illustrates a perspective view of an automotive electrical receptacle connector of the connector assembly of the second embodiment. FIG. 16 illustrates a top view of the connector assembly having the automotive electrical plug connector and the automotive electrical receptacle connector of the second embodiment. FIG. 17 illustrates an axonometric perspective view (1) of the connector assembly of the second embodiment. FIG. 18 illustrates a perspective view showing that a positioning member of the electrical plug connector is in the inserted condition, according to the second embodiment. FIG. 19 illustrates an axonometric perspective view (2) of the connector assembly of the second embodiment. In the second embodiment, an extension block 166 is outwardly extending from an end portion of the elastic arm 16. Moreover, in this embodiment, the end portion of the insertion opening 62 of the receptacle shell 6 of the automotive electrical receptacle connector 200 does not have the push block 63 shown in FIG. 2. In other words, in the first embodiment, the front end of the elastic arm 16 is parallel to the side walls of the insulated housing 1; while in the second embodiment, the extension block 166 at the front end of the elastic arm 16 is extending outwardly and slantwise. Specifically, in this embodiment, an angle is between the extension block 166 and the side walls of the insulated housing 1, and the angle is 36 degrees.

Specifically, in this embodiment, when the automotive electrical plug connector 100 is mated with the automotive electrical receptacle connector 200, the insertion opening 62 of the automotive electrical receptacle connector 200 is in contact with the extension block 166 of the elastic arm 16 of the automotive electrical plug connector 100, and a distance L between the front lateral surface of the insertion end 11 (the head portion of the insertion end 11) and the inner lateral surface of the receptacle cavity 61 (the bottom portion of the receptacle cavity 61) is 0.6 mm. Hence, the latch 17 of the automotive electrical plug connector 100 is located in the buckling hole 67 of the automotive electrical receptacle connector 200, and the automotive electrical plug connector 100 can function normally.

When the automotive electrical plug connector 100 keeps moving forwardly, the push block 63 at the insertion opening 62 of the automotive electrical receptacle connector 200 pushes the elastic arm 16 of the automotive electrical plug connector 100 away. When the automotive electrical plug connector 100 is completely inserted into the automotive electrical receptacle connector 200, the distance L becomes zero (as shown in FIG. 12). In this configuration, the positioning member 4 is pushed forwardly, and the outer wall (the stepped portion) of the engaging groove 15 of the automotive electrical plug connector 100 limits the positioning member 4, so that the sidewalls 44 of the positioning member 4 are abutted against the outer wall of the engaging groove 15 (as shown in FIG. 12). In such condition, the protruding block 161 of the elastic arm 16 is just located in the recessed groove 41 of the positioning member 4. Hence, the tongue portion 42 at the front portion of the positioning member 4 is abutted against the latch 17 of the automotive electrical plug connector 100, and the automotive electrical plug connector 100 and the automotive electrical receptacle connector 200 are locked with each other.

When the automotive electrical plug connector 100 keeps moving forwardly, the extension block 166 of the elastic arm 16 of the automotive electrical plug connector 100 pushes the edge portion of the insertion opening 62 of the automotive electrical receptacle connector 200 pushes away. When the automotive electrical plug connector 100 is completely inserted into the automotive electrical receptacle connector 200, the distance L becomes zero. In this configuration, the positioning member 4 is pushed forwardly, and the outer wall (the stepped portion) of the engaging groove 15 of the automotive electrical plug connector 100 limits the positioning member 4, so that the sidewalls 44 of the positioning member 4 are abutted against the outer wall of the engaging groove 15 (as shown in FIG. 18). In such condition, the protruding block 161 of the elastic arm 16 is just located in the recessed groove 41 of the positioning member 4. Hence, the tongue portion 42 at the front portion of the positioning member 4 is abutted against the latch 17 of the automotive electrical plug connector 100, and the automotive electrical plug connector 100 and the automotive electrical receptacle connector 200 are locked with each other.

As above, according to one or some embodiments of the instant disclosure, the terminal fixing plates are positioned in the buckling grooves to abut against the end portions of the covers of the plug terminals, so that the front ends of the terminal fixing plates is abutted against the plug terminals to prevent the plug terminals from detaching off the terminal grooves. Therefore, the plug terminals can be positioned properly. Furthermore, when the positioning member is at the locked position, the protruding block of the elastic arm is buckled with the recessed groove of the positioning member, and the tongue portion of the positioning member is abutted against the inner portion of the latch to ensure that the latch is positioned properly. When the automotive electrical plug connector is locked with the automotive electrical receptacle connector, the latch of the insulated housing is provided for locking the automotive electrical receptacle connector, and the tongue portion is abutted against the rear surface of the tongue portion. Therefore, the latch can be prevented from detaching off the buckling hole at the receptacle shell of the automotive electrical receptacle connector. conversely, when the positioning member is at the movable position, the protruding block of the elastic arm detaches from the buckling hole at the receptacle shell of the automotive electrical receptacle connector, and the tongue portion of the positioning member detaches from the inner portion of the latch, so that the latch detaches from the buckling hole at the receptacle shell of the automotive electrical receptacle connector. Hence, the automotive electrical plug connector and the automotive electrical receptacle connector are not locked with each other, and the automotive electrical plug connector can then detach from the automotive electrical receptacle connector.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. An electrical plug connector, comprising:
an insulated housing, having an insertion end at a front end and a connection end at a rear end along a front-to-back direction, wherein the insulated housing comprises a plurality of terminal grooves, a plurality of buckling grooves, an engaging groove, an elastic arm, and a latch; the terminal grooves are defined through the insertion end and the connection end; the buckling grooves are on an upper surface of the insulated housing, on a lower surface of the insulated housing, and at the insertion end; the engaging groove is at a connection surface between the insertion end and the connection end; the elastic arm is at a side surface of the connection end and outside the engaging groove; the latch is at a side surface of the insertion end and outside the engaging groove; a protruding block is protruding from an inner portion of the elastic arm;

a plurality of plug terminals, respectively inserted into the terminal grooves, wherein each of the plug terminals comprises a cover at the insertion end, and an end portion of each of the covers is at the corresponding buckling groove;

a plurality of terminal fixing plates at the buckling grooves, wherein each of the terminal fixing plates is abutted against the end portion of the corresponding cover; and a positioning member inserted into the engaging groove, wherein a recessed groove is on a side surface of the positioning member, a tongue portion is extending from one end of the positioning member, and the tongue portion is at an inner lateral surface of the latch;

wherein when the positioning member is at a locked position, the protruding block of the elastic arm is buckled with the recessed groove of the positioning member, and the tongue portion of the positioning member is abutted against the inner lateral surface of the latch, so that the latch is positioned.

2. The electrical plug connector according to claim 1, wherein when the positioning member is at a movable position, the protruding block of the elastic arm detaches from the recessed groove of the positioning member and the tongue portion of the positioning member detaches from the inner lateral surface of the latch.

3. The electrical plug connector according to claim 1, wherein a limiting groove is recessed from one side of each of the terminal grooves, each of the plug terminals comprises a sidearm at the corresponding limiting groove.

4. The electrical plug connector according to claim 1, wherein one of two ends of each of the terminal fixing plates is bent to form a sliding block, a recessed portion is recessed from one of two ends of each of the buckling grooves, the recessed portions are provided for limiting the sliding blocks.

5. The electrical plug connector according to claim 4, wherein the other end of each of the terminal fixing plates comprises a flexible arm, an inner portion of the other end of each of the buckling grooves is recessed to form a mating groove, the mating grooves are provided for limiting the flexible arms.

6. The electrical plug connector according to claim 2, wherein a tap block is protruding from the side surface of the positioning member, the insulated housing comprises a sliding groove recessed from the elastic arm, the tap block is in the sliding groove.

7. The electrical plug connector according to claim 6, wherein the insulated housing comprises a plurality of blocking portions at two sides of an opening of the sliding groove.

8. The electrical plug connector according to claim 2, wherein each of the plug terminals comprises a positioning sheet combined with the corresponding cover, each of the positioning sheets is at the corresponding terminal groove and is at the connection end.

9. The electrical plug connector according to claim 2, wherein the insulated housing comprises a plurality of stopping blocks, and each of the stopping blocks is at an inner portion of the corresponding buckling groove.

10. The electrical plug connector according to claim 2, wherein two sidewalls are bilaterally protruding from the positioning member; when the positioning member is at the locked position, the sidewalls are abutted against an outer wall of the engaging groove and at the insertion end.

11. The electrical plug connector according to claim 2, wherein an extension block is outwardly extending from an end portion of the elastic arm.

12. An electrical receptacle connector for mating with the electrical plug connector according to claim 1, comprising:

a receptacle shell, comprising a receptacle cavity and an insertion opening, wherein the receptacle cavity is mated with the insertion end, the insertion opening is in communication with the receptacle cavity, an outer wall of the receptacle shell comprises a buckling hole defined through the receptacle cavity; and a plurality of receptacle terminals received in the receptacle shell.

13. The electrical receptacle connector according to claim 12, wherein the receptacle shell comprises a push block outwardly protruding from an edge portion of the insertion opening.

14. The electrical receptacle connector according to claim 12, wherein when the insertion end is inserted into the receptacle cavity, a distance between a front lateral surface of the insertion end and an inner lateral surface of the receptacle cavity is 0.6 mm.

* * * * *